Jan. 8, 1957 R. LOWE Re. 24,263
APPARATUS FOR PROPORTIONING MATERIALS
Original Filed Dec. 10, 1947
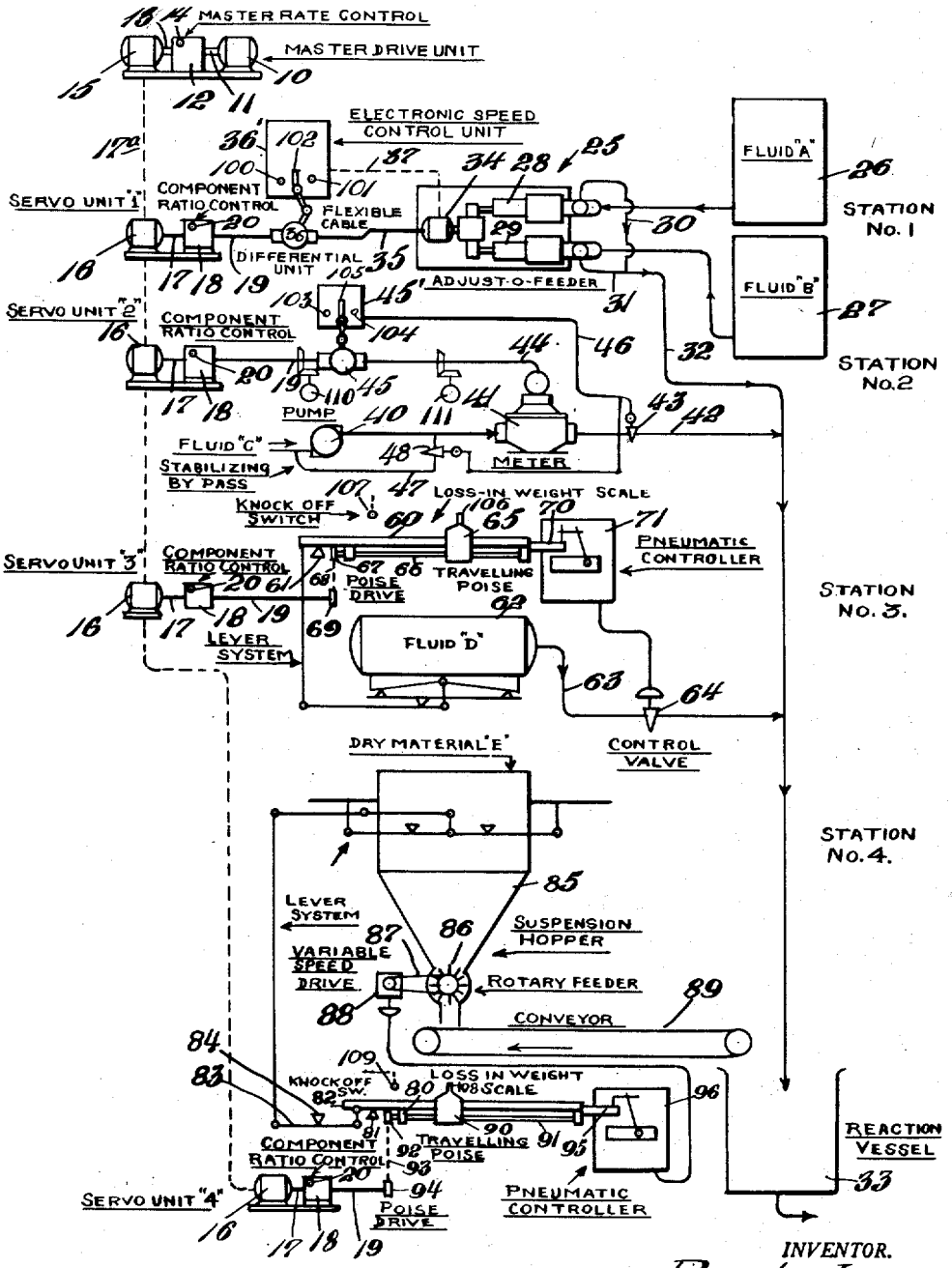
INVENTOR.
Rudy Lowe
BY
Barlow & Barlow
ATTORNEYS.

United States Patent Office

Re. 24,263
Reissued Jan. 8, 1957

24,263

APPARATUS FOR PROPORTIONING MATERIALS

Rudy Lowe, Cranston, R. I., assignor to Proportioneers, Inc., a corporation of Rhode Island Original No. 2,658,644, dated November 10, 1953, Serial No. 790,918, December 10, 1947. Application for reissue April 13, 1956, Serial No. 578,158

6 Claims. (Cl. 222—52)

Matter enclosed in heavy brackets [ ] appears in the original patent but forms no part of this reissue specification; matter printed in italics indicates the additions made by reissue.

This invention relates to an apparatus for proportioning materials where any desired number of different solid and fluid materials may be desired to be mixed together.

A unit for feeding a material has heretofore been constructed and utilized for causing the material to be delivered into some other material to be mixed therewith in accordance with a predetermined definite ratio, which ratio may be varied as required. Some of such units are designed to operate upon fluids, while other units are designed to operate upon solids.

Some proposal has been made to combine a plurality of liquids based upon the quantity of liquid flow of the final output of an apparatus, but such an apparatus has not been commercially successful.

One of the objects of this invention is to provide a plurality of different stations from each of which one or more materials is or are fed into a common receiving means or mixing chamber, which stations may be individually adjustable to provide the desired ratio of that fed material to the final result, and to at the same time provide a master control for the final output, which single master control will be variable and yet at all stages of variation will maintain the ratio which has been set at each of the stations.

Another object of this invention is to provide an apparatus in which fluids and solids may be combined.

Another object of this invention is to provide a combination of units for feeding materials of several different characteristics, while all may be controlled through a common master station.

Another object of this invention is to provide an arrangement by which the apparatus will be shut off, should one of the fed materials be exhausted.

With these and other objects in view, the invention consists of certain novel features of construction as will be more fully described and particularly pointed out in the appended claims.

In the accompanying drawings, the figure is a diagrammatic view, schematically illustrating the apparatus and showing an arrangement of different stations with flow lines or wiring means by which the different parts of the stations are connected together, and the whole connected to be controlled by the master controller.

In proceeding with this invention, I provide a master station which comprises a constant speed drive with an adjustment between the constant speed drive and an electric motor whereby this master electric motor may be varied in its speed. I then provide a plurality of different stations and in each station there is a primary driver which comprises an electric motor which is driven in synchronism with the master electric motor. Thus this primary driver of each station will maintain the same speed as the master motor and will vary with the variation in the speed of the master motor. Also I provide at each station a component ratio controller which in effect is a speed reducing device, so that the effective speed from the primary driver will be reduced prior to being impressed upon the station which it is to actuate. For instance, if station No. 1 is to supply 15 percent of the total of the finished product, the speed reducer for each one hundred revolutions put in will cause to be delivered but fifteen revolutions, so that in effect the ratio delivered from the speed reducer will be the percent of the total which the station is to deliver. With this basic arrangement it is then only necessary to use the particular type of station which will best handle the particular type of material which is to be delivered by that station and provide some hopper into which each of the materials from the various stations may be delivered to be reacted or mixed. Thus, the entire output may be controlled by varying the speed of the master up to the volume of the apparatus. Safety devices are provided so that should one of the materials be exhausted, this will stop the operation of the entire system or apparatus.

With reference to the drawings, I have provided a plurality of stations, there being here shown four in number designated by the numerals 1, 2, 3, and 4 down the right-hand side of the drawing. A master station comprises a constant drive unit 10 which provides a constant speed for a shaft 11 driven therefrom. This shaft 11 enters a gear box 12 from which there emerges a shaft 13 and by adjustment of gears in this gear box through a knob 14, the speed of the shaft 13 may be controlled or varied as desired. This shaft 13 drives the master motor 15, which motor serves to drive through an electrical synchronous connection, the servomotors at each of the various stations. Thus there is provided servo unit 1, servo unit 2, servo unit 3, and servo unit 4 at each of the four stations, each designated for convenience 16 and shown as being connected together and to the master motor controller 15 by an electric circuit indicated by a dotted line 17 so as to cause the master motor to control the speed of the several other motors which are connected thereto. Upon an increase or decrease in the speed of the master motor 15 there will be a like increase or decrease in each individual motor 16. Each of the servo units or motors 16 has a shaft 17 extending therefrom into a gear box or some sort of a ratio controller designated 18, from which there emerges a shaft 19. The ratio controller 18 is manually adjustable as by means of a hand knob 20 to vary the speed of the shaft 19 to bear any proportion which is desired to the speed of the shaft 17 which is driven by the motor 16. For instance, if it is desired that station 1 deliver 15 percent of the material to the final ratio of proportioned material, the controller 18 will be adjusted for the shaft 19 of station 1 to rotate fifteen revolutions for each one hundred revolutions of the shaft 17. If it is desired that there be delivered 20 percent of the material in the final mixture at station 2, the controller 18 of station 2 will be adjusted for the shaft 19 of station 2 to rotate twenty revolutions for each one hundred revolutions of the shaft 17. If it is desired that the material delivered by station 3 shall be 30 percent of the final mixture, the controller 18 of station 3 will be adjusted for the shaft 19 of station 3 to rotate thirty revolutions for each one hundred revolutions of the shaft 17. And if it is desired that the material delivered by station 4 shall be 35 percent of the final mixture, controller 18 of this station 4 will likewise be adjusted to rotate the shaft 19 of this station 4 to rotate thirty-five revolutions for each one hundred revolutions of the shaft 17. Each station is initially adjusted to set each component ratio controller 18 at this desired quantity.

Station 1 is indicated as a device for drawing two fluids *A and B* into a proportioning apparatus designated generally 25 from sources of supply [indicated in the drawing as fluid A and fluid B] at 26 and 27, *respectively*.

These fluids pass through suitable conduits into [the] pump cylinders 28, [and] 29 of a predetermined piston displacement and are delivered therefrom through conduit 30, [and] 31 into [the] *a* common feed conduit 32 which extends to [the] *a* reaction vessel 33 for accumulating all of the materials which are fed from the various stations. This pump is driven by an electric motor 34, [so that] the [proper quantity] *rate of delivery* of material [is delivered] *being* in proportion to the speed of the motor. This motor 34 has a flexible shaft 35 which is connected to one side of a differential mechanism designated generally 36 which is driven on the other side thereof by the shaft 19. [Upon any] *Any* [variations] *variation* between the speeds of shafts 19 and 35, [this difference in speed] will set up a motion in the *output* mechanism of the differential 36 [to be] *which is* transmitted through suitable connections to actuate an electronic control 36' [to actuate] *for* the field of *the* motor 34 which *control* is connected thereto by an electric [circuit] *connection* 37 shown in dotted lines, to cause the motor to go either faster or slower so as to maintain the speed of this motor in the direct relation to the speed of the shaft 19, and thus cause the delivery through the pipe 32 of fluids A and B to be in [a definite] *preset* ratio [of] *to* the *total delivery* [whole] *such ratio being* determined by the speed [of rotation] of shaft 19 of station [No.] 1.

In station 2 a fluid C is drawn from some suitable source of supply (not shown) by a pump 40, and this fluid is caused to pass through a meter 41 in *a* conduit 42 to join the main delivery line 32 to the reaction vessel *33*. A valve [at] 43 serves to control the [supply of quantity] [delivered] *delivery* through the pipe 42.

[The meter 41 rotates in accordance with the quantity which passes therethrough, and flexible shaft 44 impresses the value of this quantity upon a differential device 45 which is similar to device 36 and, which device 45 is driven by shaft 19 of the second station. Upon any variation between the speeds of these two shafts 44 and 19, this difference in speed will likewise be transmitted through the differential mechanism 45 by suitable connections therefrom to a controller 45' to actuate the same which may be an air pressure device controlling a fluid in a conduit 46 connected to a diaphragm-controlled valve 43 to operate the same so as to open or close this valve to adjust the flow therethrough so as to increase or decrease the speed of the shaft 44 to return the same to the speed of the shaft 19 of station 2. A by-pass through line 47 is provided and a valve 48 which is actuated in time with the valve 43 serves to also control this by-pass. Thus if the valve 43 is closed, the valve 48 will be open, so that the liquid which passes through the meter will be directed back to the pump for re-circulation.]

*The meter 41 rotates at a speed dependent on flow therethrough, and a flexible shaft 44 connected to the meter impresses this speed upon a differential device 45 which is similar to the device 36 and which is also driven by shaft 19 of the second station. Any variation between the speeds of these two shafts 44 and 19 will be transmitted through the differential mechanism 45 to actuate a controller 45'. The controller 45' is arranged to control air pressure supplied to a conduit 46 which is connected to a diaphragm-controlled valve 43 whereby pressure variation adjusts the flow through the valve. A by-pass line 47 is provided and a valve 48 is arranged in this line which is also connected to the conduit 46 for actuation by the controller 45'. The valves 43 and 48 are arranged whereby pressure change in one direction closes valve 43 and opens valve 48, and pressure change in the other direction has the reverse effect. For any given speed of the shaft 19 of the station 2 the valve 43 is set to pass the desired flow to the conduit 32, and if the pump 40 supplies a greater flow, the surplus is by-passed through the by-pass line 47. If, in operation of the apparatus at this speed of the shaft 19, more liquid is delivered to the conduit 32 than is required, the meter speed will exceed that of the shaft and the differential 45 will move such that the controller 45' applies pressure to the line 46 whereby the valve 43 is moved towards closed position and the valve 48 is opened to increase flow through the by-pass line 47. The reverse action would occur if the flow to the conduit 32 were less than the required flow.*

At station 3 there is provided a loss-in-weight scale which operates on the principle disclosed in the Montgomery Patent, 1,983,093, dated December 4, 1934. Thus there is shown a beam designated 60 having a fulcrum at 61 and fluid D to be dispensed from a tank 62 which is suspended on one side of the fulcrum and from which tank a conduit 63 leads to the conduit 32. This conduit is controlled by valve 64.

On the other side of the fulcrum, a counter [balance] weight 65 is provided which may be slid along the beam 60 by means of a threaded shaft 66 which is rotated at a speed [ratio] defined by the speed of [rotation of] shaft 19 of station 3. The counterweight 65 is pre-set along the beam 60 to balance the weight of the tank 62. If the [volume by weight] *rate* of fluid [D discharged] *discharge* from the tank is proportional to the movement of the weight 65 along the beam, there will be no motion of the beam 60. If the [volume of] discharge [of fluid D] *rate* exceeds or is less than the movement of the weight 65, there will be a movement of the beam about the fulcrum 61. [This] *The* threaded shaft *66* is provided with a sprocket gear 67 driven by *a* sprocket chain 68 and *a* sprocket gear 69 on the end of shaft 19 of this station 3, so that as the threaded shaft 66 turns, the weight 65 will move along the beam. Liquid can leave the tank 62 only in proportion to the [open amount] *opening* of the valve 64, and if *the weight of* this liquid [volume by weight] exceeds or is less than the pre-set rate of movement of the weight 65 along the beam 60, the beam 60 will rock about its fulcrum to raise or lower the end of the beam at 70 and through suitable connection actuate a pneumatic controller 71 which operates [to open or close] the valve 64 to adjust the amount of liquid which is being drawn from the tank 62. The beam is rocked about its fulcrum in response to variation in the [pre-set flow] *rate* of fluid [D] *flow* from the tank 62 and the arrangement for effecting a movement of the beam is a differential means for providing a control of the [quantity of material delivered] *rate of delivery* at station 3.

Station 4 is operable on substantially the same principle as station 3, only in this case a dry or solid material is provided for delivery. As in station 3, a beam 80 is [provided fulcrumed as at] *pivotable on a fulcrum* 81. The load is attached to *the beam at 82 on* the *left-hand* side of the fulcrum [as at 82] through another lever 83 [fulcrumed] *pivoted* at 84 and connected to [the] *a* hopper designated generally 85 [in which] *for* the solid material [to be dispensed is located]. This material is [permitted to be] discharged from the hopper 85 through a wheel 86 driven by *a* belt 87 from the motor 88[,] [and] *the speed of* this motor may be varied [in speed] to cause more or less of the material to be delivered upon a conveyor 89, which travels [so as] to dump the material conveyed into the reaction vessel 33.

A counter [balance] weight 90 is slidable along the beam 80 and pre-set to balance the weight of the hopper 85; *the weight* [and] is moved along the beam by screw 91 [which is driven to rotate] *rotated* at a speed [ratio] defined by the speed of rotation of shaft 19 of station 4 by [a gear 92 through] *the screw 91 and shaft 19 carrying* sprocket *gears 92* [chain 93] and [sprocket gear] 94, *respectively, which are connected by a chain 93* [and on the end of shaft 19 of servo unit 4]. Should the material be delivered at a [ratio] *rate* in excess or less than the movement of the weight 90, then the beam will swing about its fulcrum so as to move *an end* [the] portion 95 *of the beam* which through suitable connection will actuate a mechanism 96 [operable] to cause the motor 88 to [either] speed up or slow down as necessary to right *the* [the quantity of material discharged] *discharge* to [that] *the quantity* pre-set.

Delayed action devices may be used for the controls, so that [excessive] hunting [back and forth] in any of these mechanisms will be avoided.

Should there be a variation in the material delivered at [any] *either of* station *1 and 2* to such a degree as to produce a movement of the differential beyond *a* pre-set [tolerances] *tolerance* in the differential mechanism in either direction, then a switch may be thrown to stop the entire apparatus, [as] for instance *by* stopping [of] the master drive unit, so that material [in an improper proportion] cannot be delivered to the reaction vessel *in the wrong proportion.* [For example, in] *In* station [No.] 1 contacts 100 and 101 are provided at either side of the swinging arm 102, which arm is moved by a differential motion of the unit 36 so that if [excessive] movement of the arm beyond pre-set tolerances occurs, said arm will engage one [or the other] of said contacts which operate through suitable [connection] *connections* [to interrupt the supply of electrical energy] to the master drive. Likewise, contacts 103 and 104 on either side of arm 105 in station [No.] 2 may cause the same result [; or in]. *In* station 3 the beam weight 65 may move the arm 106 to engage the knock-off of switch 107 to cause the master motor to stop; or in station [No.] 4 the weight 90 may have its arm 108 engage knock-off switch 109 to cause the same result. Thus, should the supply at one station be exhausted, the apparatus would stop operation.

The apparatus contains a feature which makes it possible to [mathematically pre-test] *pre-set* a given blend [setup] *of material which would be delivered to the reaction vessel 33* without passing any material. All previous [blenders] *blending apparatuses* were limited (a) by the fact that they depended for operation on a primary flow and (b) because of wear in the speed reducing means and the fact that the output of these devices was not a straight line, dial settings were frequently misleading. In [my] *the* apparatus *above described,* [each secondary panel] *station 2* [regulated from the master speed control] is equipped with two [reset] *resettable* totalizers such as 110 and 111 [of the Odometer type (similar to] *providing the same kind of indication as* an automobile mileage indicator[)], one *totalizer* 110 [of these being] *is* driven from the output shaft of the speed reducer at the input of the differential unit, and the other 111 [being] *is* driven from the metering device connected to the other side of the differential gear. These two totalizers always check each other, and should they fail to do so, the equipment will automatically shut down. [By depressing the proper control switch I am able to totalize the respective components before actually delivering any chemical, whether liquid or dry.] *Similar totalizers (not shown) may be provided for the other stations and a control switch may be provided to enable an operator of the apparatus to totalize the components of the blend before actually delivering any material whether liquid or dry.*

I claim:

1. An apparatus for proportioning a plurality of materials, comprising a plurality of stations for the different materials, a controller at each station for controlling the quantity of material fed at its station, a master controller for all of the first said controllers and manually adjustable to pre-set the rate at which a particular combined quantity of materials is to be fed from said stations, said controller at each station being manually adjustable to pre-set the quantity of material fed at its station at a predetermined proportion relative to the said predetermined combined quantity of material fed from said stations, a differential mechanism at each station for controlling the quantity of material fed at its station at the predetermined setting of the controller of the station, each of said controllers at said stations being responsive to any change in setting of the master controller and automatically operable to control the differential of its station so as to maintain the said pre-set proportion of material fed at its station.

2. An apparatus as set forth in claim 1 further comprising means to stop the apparatus upon the exhausting of one of the materials fed.

3. An apparatus for proportioning a plurality of materials, a plurality of stations for the different materials, means at each station for feeding the material therefrom at a predetermined proportion, a feed control means at each station to control the quantity of material fed therefrom, a master controller rotatable mechanism having an output shaft therefrom, said mechanism being manually adjustable to pre-set the rate of speed of rotation of said shaft, a second controller rotatable mechanism at each station having an input shaft rotatable at the pre-set rate of rotation of said output shaft, each of said second controllers being responsive to any change in speed of rotation of said output shaft for automatically maintaining the speed of rotation of each of said input shafts equal to the speed of rotation of said output shaft, said second controllers each having an output shaft, each of said second controllers being manually adjustable to initially pre-set the speed of rotation of its said output shaft at a predetermined ratio to the speed of rotation of its input shaft and automatically operable to maintain said speed ratio at any change in the speed of rotation of its input shaft, a differential at each station connected to the said output shaft of the second controller at said station and operable for controlling the feed control means at each station and responsive to any change in the speed of rotation of the output shaft connected thereto so as to maintain the quantity of material fed controlled thereby at the same predetermined proportion for any change in the setting of the master controller.

4. An apparatus for proportioning a plurality of materials, a plurality of stations for the different materials, each station comprising means for measuring the quantity of material fed at the station, a controller manually adjustable for pre-setting the quantity of material fed at the station, a rotatable differential having an input and output side, said input side thereof being operatively connected to said controller and rotated thereby, and its output side connected to said measuring means, said differential being operable to increase or decrease the quantity of material fed at the station upon a difference between its input and output rotation, a master controller for all of said stations manually adjusable to pre-set the quantity of the combined feed of material at said stations, said controllers at said stations each being responsive to said master controller and automatically operable to increase or decrease the input ratios of said differential to maintain the pre-set proportion quantity of material fed at its station.

5. An apparatus as set forth in claim 4 in which said master controller includes a master motor and said station controllers each include a motor synchronized to rotate with said master motor.

6. An apparatus as set forth in claim 4 in which said controllers are speed changing devices.

References Cited in the file of this patent or the original patent

UNITED STATES PATENTS

| | | |
|---|---|---|
| 1,492,271 | Snyder | Apr. 29, 1924 |
| 1,766,625 | Geary | June 24, 1930 |
| 1,886,575 | O'Connor | Nov. 8, 1932 |
| 2,248,072 | Fry | July 8, 1941 |
| 2,345,524 | Ziebolz | Mar. 28, 1944 |